United States Patent [19]
Berg

[11] 3,757,496
[45] Sept. 11, 1973

[54] APPARATUS FOR COLLECTING FILTERED AIRBORNE

[75] Inventor: Arthur Henry Berg, Central Square, N.Y.

[73] Assignee: Cambridge Filter Corporation, Syracuse, N.Y.

[22] Filed: July 13, 1972

[21] Appl. No.: 271,381

Related U.S. Application Data

[63] Continuation-in-part of Ser. No. 103,461, Jan. 4, 1971, abandoned, which is a continuation-in-part of Ser. No. 791,266, Jan. 15, 1969, abandoned.

[52] U.S. Cl. .................. 55/293, 55/294, 55/350, 55/487, 55/501
[51] Int. Cl. ................................................ B01d 46/02
[58] Field of Search .................. 55/293, 302, 294, 55/350, 487, 501; 210/393

[56] References Cited
UNITED STATES PATENTS
3,315,446  4/1967  King, Jr. ....................... 55/302

3,545,180  12/1970  Schrag ........................... 55/293

FOREIGN PATENTS OR APPLICATIONS
1,639  1911  Great Britain ................... 55/294

*Primary Examiner*—Bernard Nozick
*Attorney*—Charles S. McGuire

[57] ABSTRACT

Apparatus for collecting filtered airborne solid particles employing a rectangular section of filtering screen affixed to arcuate and vertical frame members to present a semi-cylindrical surfaced filtering screen arranged in the path of flow of air a suction nozzle having an orifice reciprocally movable about an axis concentric with the axis of the arcuate members and screen, means for applying suction to remove from the concave side of the screen solid particles deposited thereon, means for periodically oscillating the nozzle over substantially the entire arcuate length of the filter screen, optional means to stop the oscillation midway across the screen, and a perforate semi-cylindrical support shell disposed on the outside of the screen.

16 Claims, 17 Drawing Figures

INVENTOR.
ARTHUR BERG.

INVENTOR.
ARTHUR BERG.
BY
ATTORNEY

INVENTOR.
ARTHUR H. BERG.

INVENTOR.
ARTHUR H. BERG.
BY
ATTORNEY

APPARATUS FOR COLLECTING FILTERED AIRBORNE

REFERENCE TO RELATED APPLICATIONS

This application is a continuation in part of application Ser. No. 103,461 filed Jan. 4, 1971, which was a continuation in part of application Ser. No. 791,266 filed Jan. 15, 1969, both of which are now abandoned.

BACKGROUND OF THE INVENTION

This invention relates to apparatus for use in air filtration, and more particularly to apparatus for collecting solid matter which has been deposited on filtering media by passage therethrough of air in which the solid matter is carried.

In the textile industry, for example, where weaving, spinning, knitting, and like operations are conducted, a considerable quantity of lint is generated which initially is air borne. Such lint has a tendency to settle, building up hazardous accumulations in areas about a mill where air circulation is lacking. The more circulation of outside air through a mill, to maintain the level below an intolerable degree, results in contamination of the atmosphere, and loses sight of the reclaim value of such lint. Since ordinary air filtration systems would be quickly clogged by the build up of lint, it is highly desirable to provide some means for separating the lint from air entering an air conditioning system, to avoid accumulations which eventually would seriously affect the operation.

There are many other similar applications, of course, where solid particles must be removed from an air supply and the build up of such particles on a filter media is rapid and substantial. In processing various grains, for example, chaff and other particles may tend to clog filters unless frequently removed. Metal dust, and other such particles, may present similar problems in still other operations.

SUMMARY OF THE INVENTION

The present invention is directed to a filter or collector adapted to remove solid particles from the air, while providing a collector system for the particles deposited on the filter which is capable of maintaining the essentially filter surface clean. More particularly, the filter or collector comprises apparatus suitable for installation in an air conditioning duct, and capable of removing solid particles from air as it enters the duct. This is accomplished without serious interferences with the flow of air, and the apparatus is such as to remove the particles from the air stream on a continuous basis, to maintain high efficiency at all times.

The apparatus includes a screen which may be of flexible or rigid material disposed in a semi-cylindrical configuration, preferably supported by differential pressure against an open mesh, semi-cylindrical, expanded metal rigid backing, the differential pressure resulting from air flow through the screen and holding the screen against the backing. Oscillatory sweeping suction means operating on the upstream side of the screen sweeps the screen on a continuous basis to remove the particles deposited thereon as the air passes through. The screen and semi-cylindrical backing may be disposed about a vertical axis, or a horizontal axis as desired, the latter having advantages as will hereinafter be appreciated. When arranged to intercept relatively horizontal air flow toward the screen, the screen is preferably disposed semi-circularly about a horizontal axis.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention; reference being had for this purpose to the appended claims.

BRIEF DESCRIPTION OF THE DRAWINGS

In the drawings, wherein like reference characters indicate like parts:

FIG. 6 is a fragmentary enlarged sectional view of the suction nozzle and screen, taken substantially on the line 6—6 of FIG. 5;

Referring to the embodiment of FIGS. 1-10, and particularly FIGS. 1-6, there is shown an arcuate frame structure adapted to support the edges of semi-cylindrical sections of screening material in an air duct, in such manner as to permit the differential air pressure through the screening to maintain the latter substantially in the semi-cylindrical configuration of the frame. In FIG. 1 there are shown channel member uprights 20 and 22 which are disposed vertically along opposite side walls of a rectangular sectioned air duct 24 into which air is drawn by a suitable suction blower (not shown) disposed in the duct downstream of the collecting apparatus. The frame may comprise a plurality of semi-circular upper and lower angle irons 26, 28, and intermediate angle irons 30 and 34, and a channel angle iron 36 bolted to the uprights 20 and 22, as indicated at 21 in FIG. 8. The angle irons 30 and 34 are provided with semi-circular horizontal bulk heads 38 and 40, and the space between bulk heads 38 and 40 and the base and top of the assembly respectively are closed off by flat and arcuate plates 45 and 47, and 46 and 48 respectively.

Figure 1:
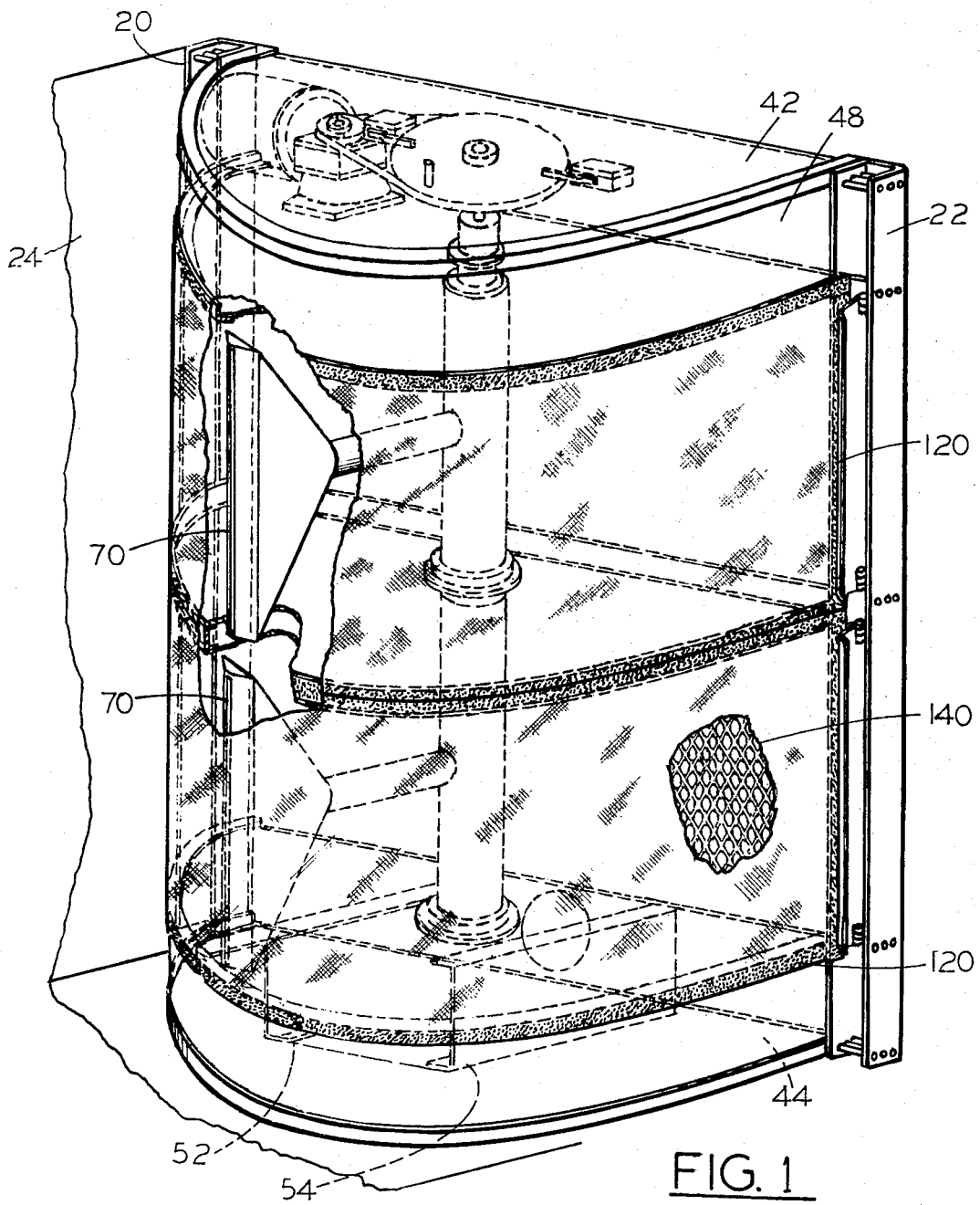
FIG. 1 is a perspective view of a collecting assembly arranged about a vertical axis.
Figure 2:
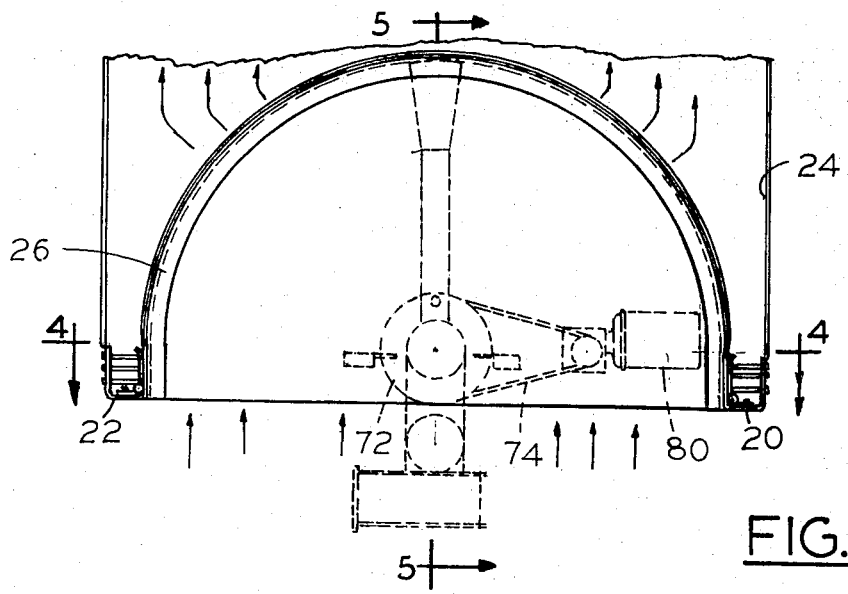
FIG. 2 is a plan view of the assembly of FIG. 1.
Figure 3:
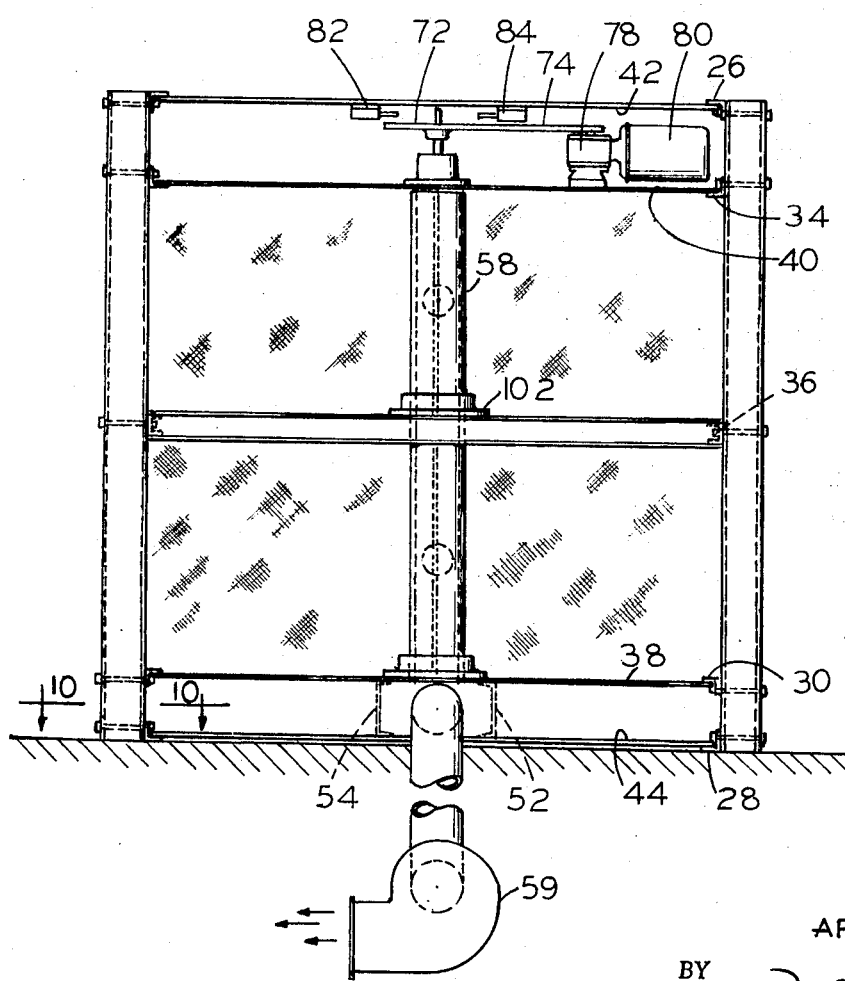
FIG. 3 is a rear elevational view of the assembly of FIG. 1.
Figure 4:
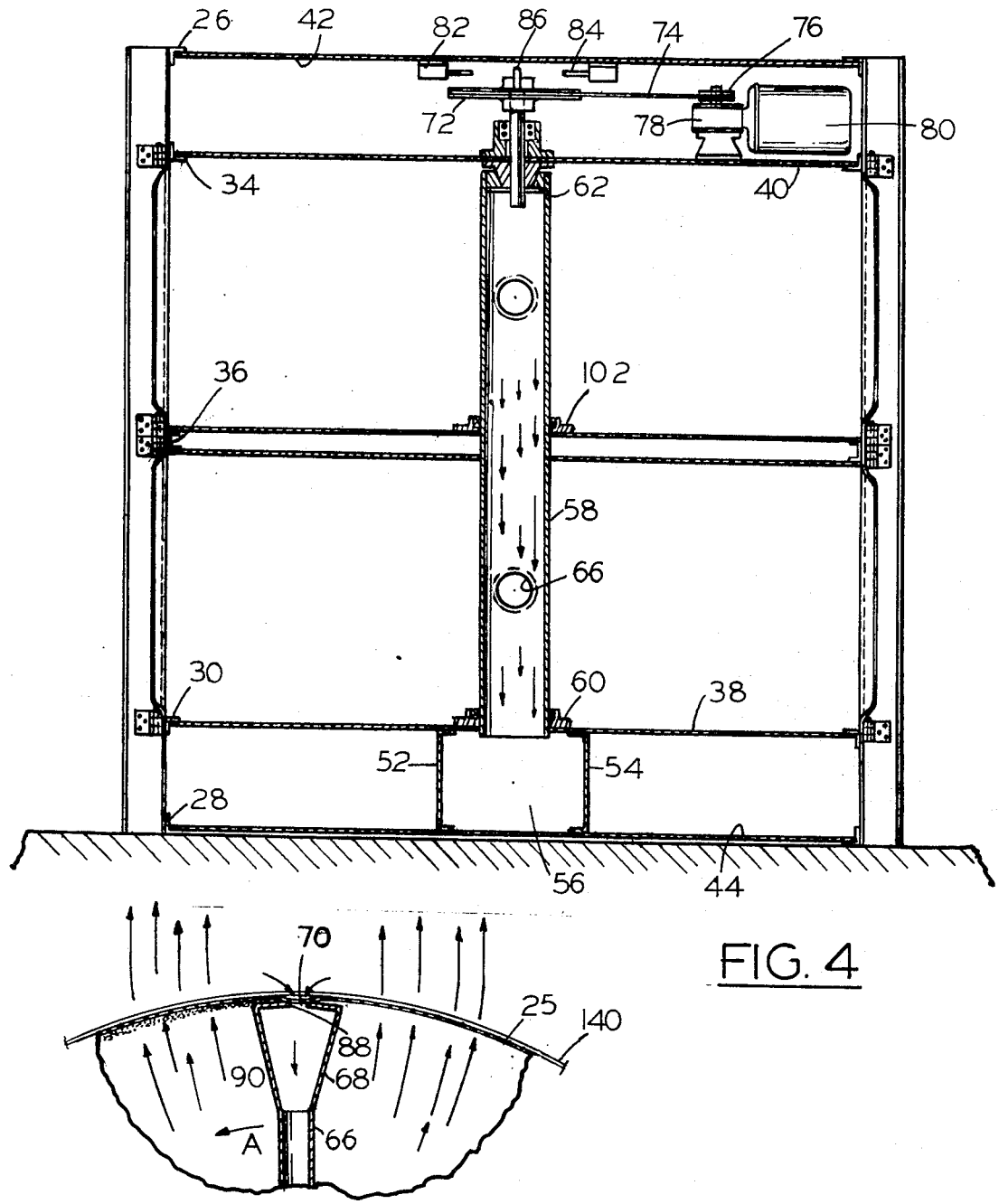
FIG. 4 is a sectional view taken substantially on the line 4—4 of FIG. 2.
Figure 5:
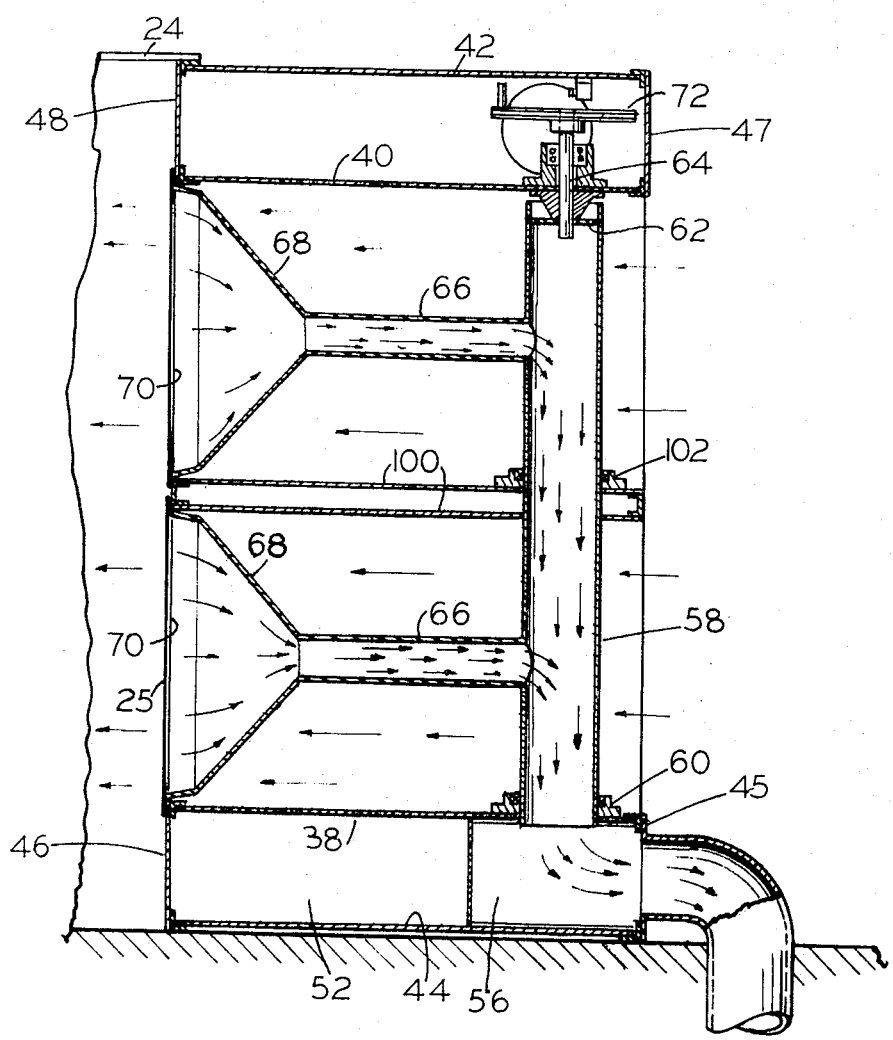
FIG. 5 is a sectional view taken substantially on line 5—5 of FIG. 2.

The angle irons 30 and 34 are suitably spaced from the center channel 36 to accommodate a filtering media such as a suitable porous woven screening material of a fine mesh, capable of blocking the passage of air borne solid particles therethrough. Between the lower bulk head 38 and the bottom wall 44 of the duct are spaced channel members 52 and 54 defining a collection duct 56, which may be coupled to a blower 59, and a bagging operation. Concentric with the arcuate framing members 30, 34 and 36 is a vertical tube 58 having its lower end opening into the duct 56, and journalled as at 60 in the bulk head 38. The upper end of the tube is closed off as at 62, and journalled in the upper bulk head 40, the tube having keyed thereto a heavy stub shaft 64 projecting into the space between the bulkhead 40 and the upper wall 42.

Projecting radially from the tube 58 are hollow sweeper ducts 66, having on their ends suction nozzles 68, adapted to sweep close to the inside surface of the screening 25. The radial location of the nozzle orifices 70 is just inside the normal radius of the screening 25, as held by the differential pressure or by a semi-cylindrical perforate backing plate 140 behind the screen by air flow passing downstream in the duct 24, causing the screening 25 to balloon out into the semi-cylindrical configuration shown, or held against the backing plate. As is indicated diagrammatically in FIG. 6, the air stream flowing through the screen 25, by reason of the induced flow in the duct 24 creates a radial differential pressure on the screen 25 uniformly over its entire surface.

In order to progressively sweep the upstream surfaces of the screen 25 by the suction nozzle for removal of solid particles from the upstream screen surface, the tubular column 58 is oscillated slowly through an angle of about 180°. For this purpose the stub shaft 46 is provided with a large pulley 72 having a belt or chain drive 74 to a speed reduction output pulley 76 of a speed reducer 78 associated with the reversible motor 80. Through the use of limit switches 82 and 84 actuated by a pin 86 on pulley 72, and a suitable control circuit, the movement of the suction nozzles 68 are caused to reverse after 180 degrees of travel in either direction.

It can be seen in FIG. 6, that as the nozzle moves adjacent the inside of the semi-cylindrical screen 25, suction at the orifice 88 may flex the screen 25 into engagement with the nozzle lips, assuming the screening to be flexible and the nozzle to be positioned on a radius slightly less than the radius of curvature of the screening.

With the nozzle to be moving in the direction of arrow A solid matter such as lint L that has gathered on the upstream side of the screen 25 passes between the screen and the inclined chordal flank 90 of the nozzle, and as the nozzle orifice sweeps along the inside surface, lint collected on the screen is drawn by suction into the collector and delivered through the blower 59 to a bag or other receptacle, which can be replaced as often as filling takes place.

In practice, the nozzle sweep may be driven by a three phase motor 80 having an electro magnetic reversing switch 94, actuated alternately by the limit switches 82 and 84, it being understood that actuation of the switch may be time delayed, if desired, to afford the motor time to decelerate before applying reverse current.

Figure 9:
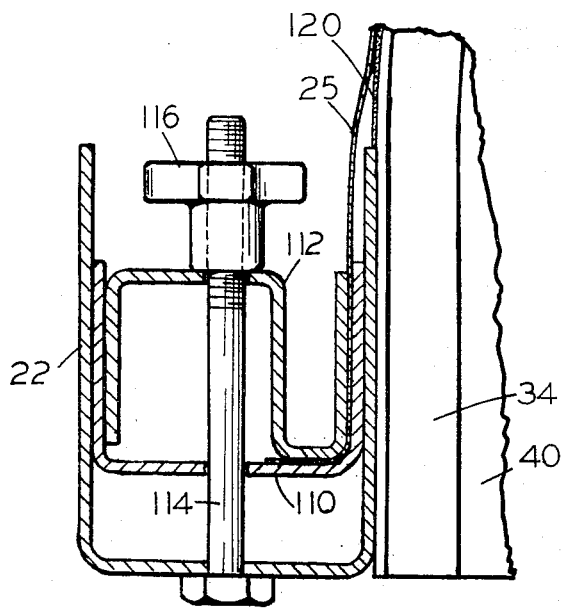
FIG. 9 is a sectional, fragmentary view of a screen clamping arrangement.

The vertical spacing between the arcuate angle iron members 34, 36 and 30 may be such as to accommodate commercial widths of screening or filter media. If desired, one or more bulk heads 100 may be provided at each level between suction nozzles 68, in which case a central bearing 102 for the tube 58 may be provided. The screen or filter media may, for example, comprise a mono-filament woven mesh of 60 to 80 pores, or filaments per inch. Thicker media such as reticulated polyurethane foam with a screen backing on the downstream side may be provided. Likewise, a rigid filter member of steel screening, for example, may be used if desired. The ends of such screening or filter media may be clamped between channel member 110, and a nesting S-section channel 112, the channels being adapted to grip the end of the media 25 as indicated in FIG. 9. Two or more bolts 114 with thumb nuts 116 may be provided along the length so that even light tension may be applied to the media, to assure contact of its upper and lower edge portions with the arcuate members defining the upper and lower margins of the media area of what may be referred to as one module. Any number of modules may be employed to provide an adequate overall collecting screen area.

The surfaces of the angle member into which the media contacts may be provided with "VELCRO" in ribbon or strip form as at 120, such material having minute parts adapted to hook or intermesh complementally with the media edge portion upon application of the media thereto to resist detachment and lateral movement. Such strips permit forceable lifting of the media therefrom, for removal, but hold the media against lateral movement.

Figure 10:
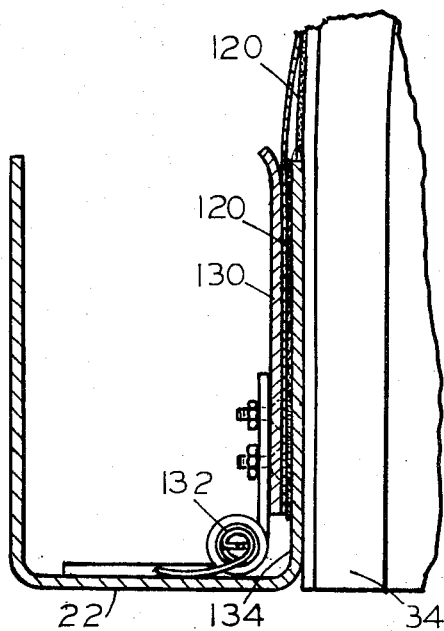
FIG. 10 is a sectional, fragmentary view of an alternative screen clamping arrangement.
Figure 8:
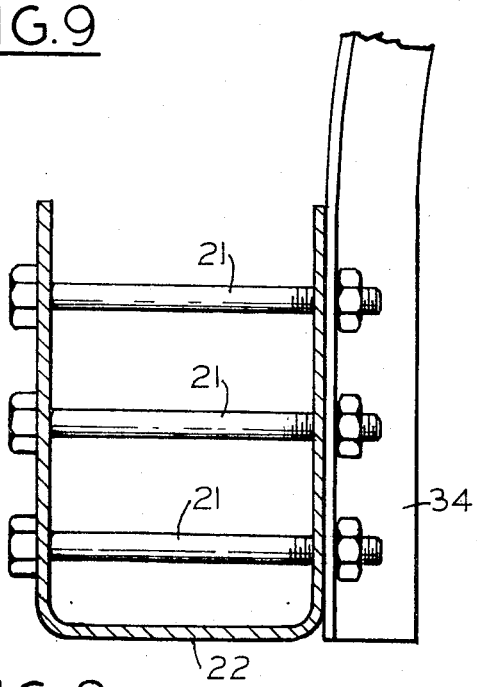
FIG. 8 is a sectional, fragmentary view at the base taken on the line 8—8 of FIG. 3.
Figure 7:
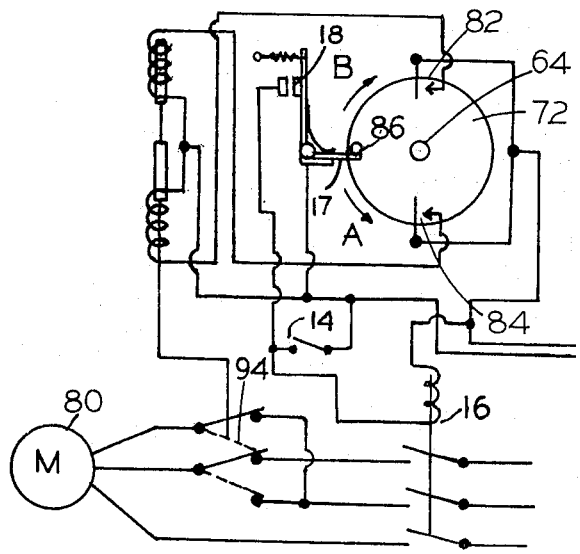
FIG. 7 is a schematic circuit diagram.
Figure 14:
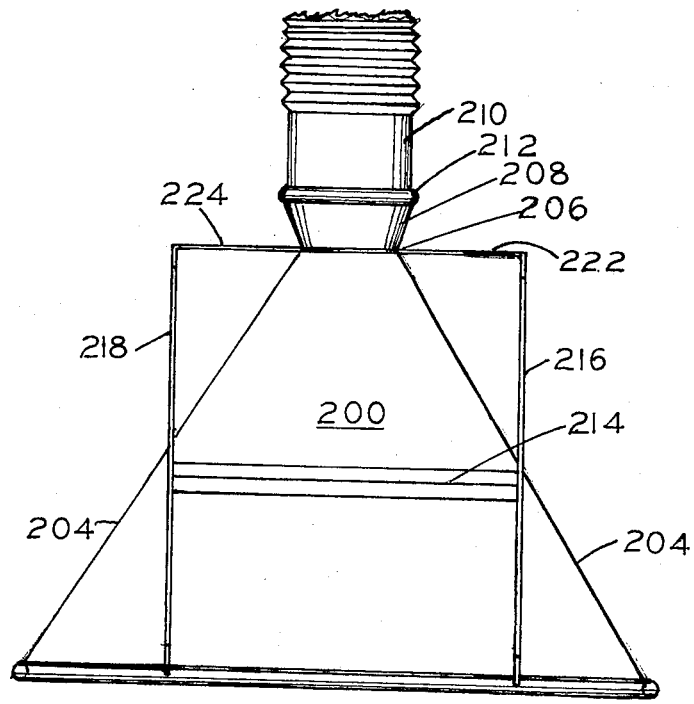
FIG. 14 is a side view of the nozzle.
Figure 15:
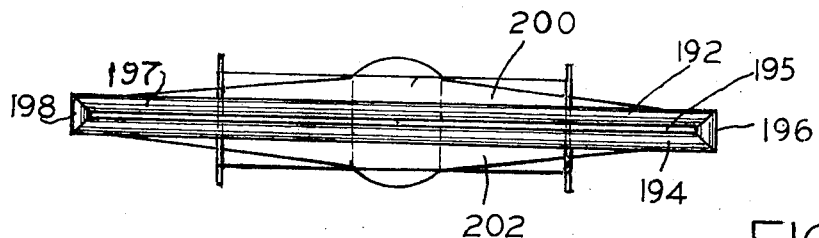
FIG. 15 is an end view of the nozzle.
Figure 13:
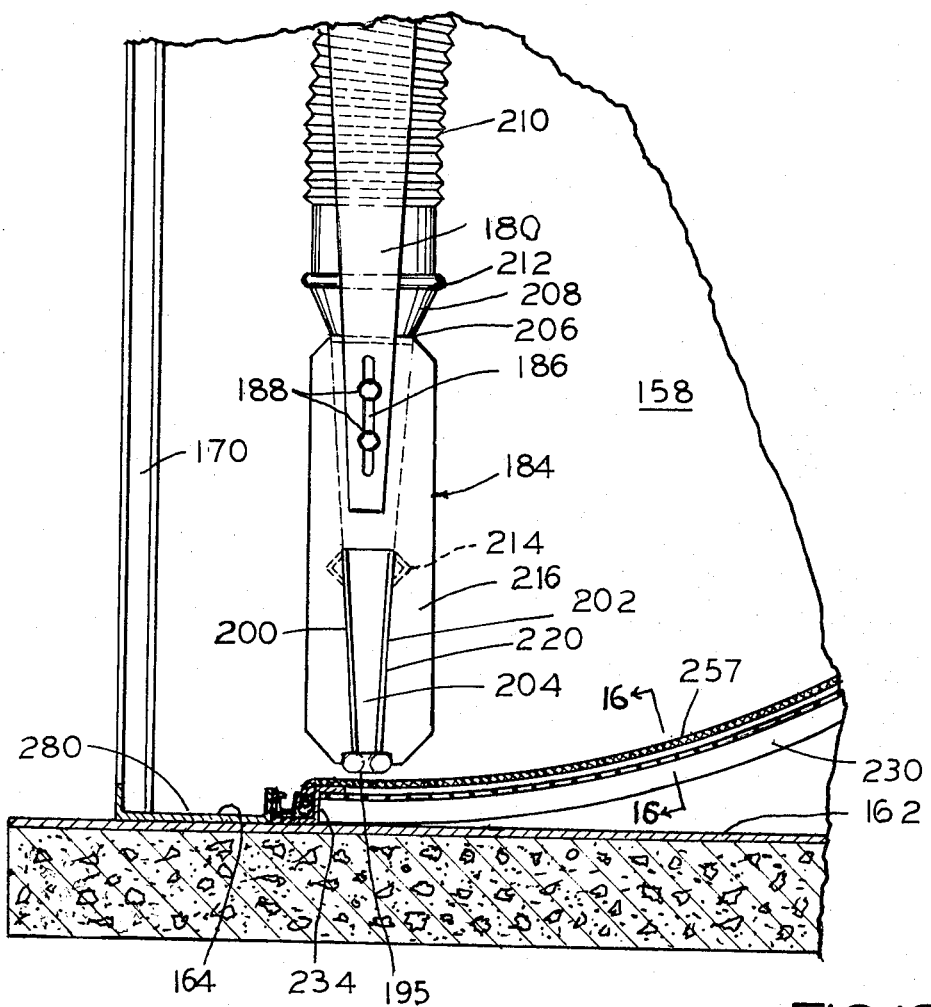
FIG. 13 is an enlarged, fragmentary, sectional view of the lower portion of FIG. 12.
Figure 12:
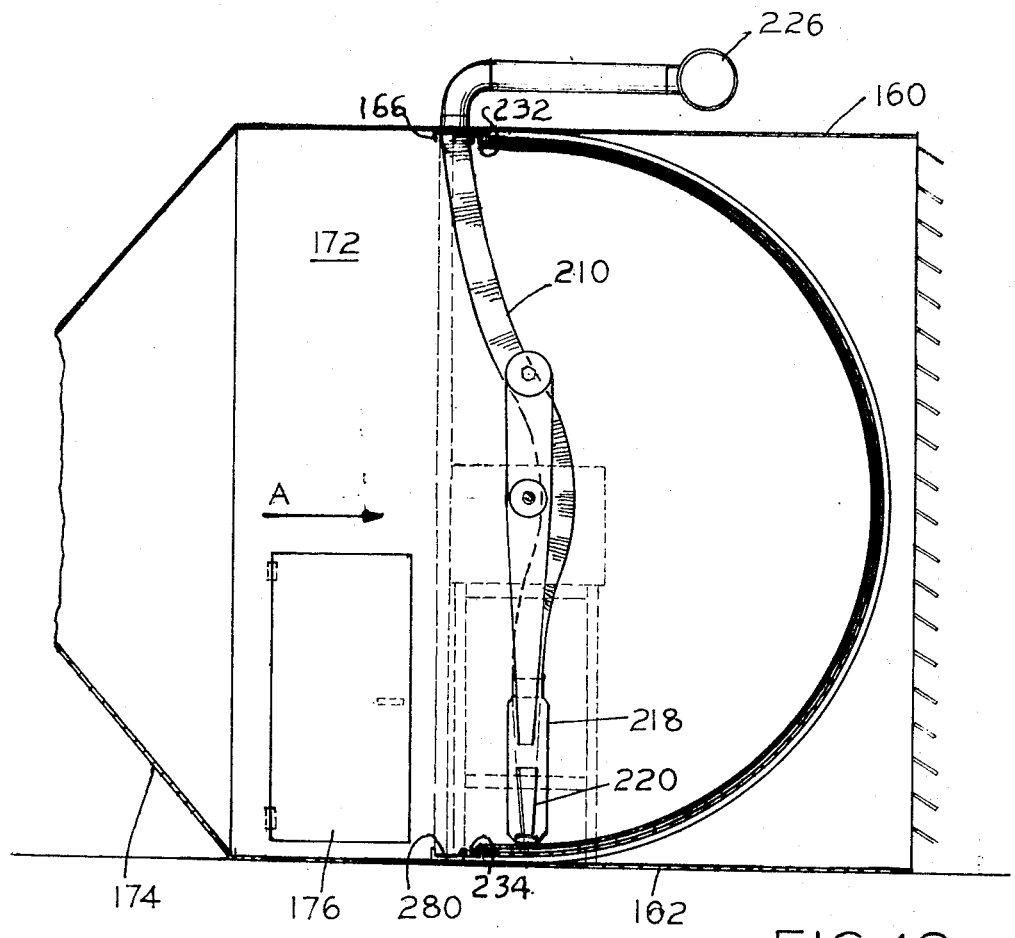
FIG. 12 is a sectional view through one of the modules of FIG. 11 indicating duct work leading up to the screen.
Figure 17:
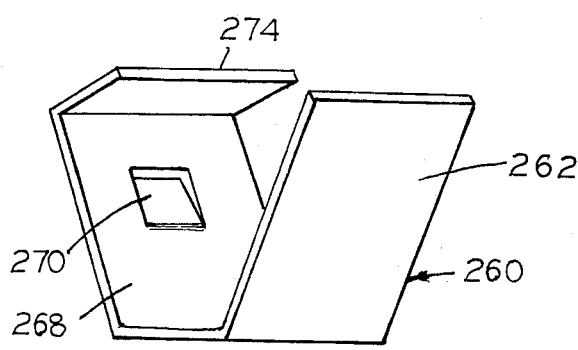
FIG. 17 is a perspective view of a locking clip shown in FIG. 16.

In FIG. 10, a modified clamp for the ends of a section of media is shown, wherein, a pressure plate 130 spring hinged at spaced points along its length as at 132 is provided. In this form, the inside face 134 of the channel member 22 may have a thin ribbon of material 120 to hold the ends of the media during installation, after which the pressure of the plate 130 enhances the holding power. As before, the outside faces of the arcuate members will be provided with intermeshing media strips 120 as indicated.

It will be appreciated that the suction applied to the nozzles will be of a high order to create a high rate of flow as compared with the rate of flow of the airstream in the duct 24, and through the screen 25, so that the solid particles deposited on the inside surface of the screen will be completely cleared by the sweep of the suction nozzles. When a flexible filter media or screen is used, semi-cylindrical shell 140 is disposed in supporting relation to the screen on the downstream side thereof, such shell forming a semi-cylindrical support against which the media rests by reason of the duct air flow and the differential pressure on the media. This guards against screen blow out and causes the screen to exactly conform to a semi-cylindrical configuration, concentric with the axis on which the nozzle oscillates, and at a uniform spacing from the nozzle slit, thereby achieving more uniform operation in removing the solid particles by suction. Since the suction of the vacuum nozzle tends to draw the media radially inward into contact with the nozzle, due to its flexibility the media may be temporarily moved or flexed against the force of the air duct air stream and away from the guard as the nozzle moves by. Thus, nozzle suction on the inside surface is not affected by the guard. In practice the guard may be of perforate sheet material such as flattened, expanded metal, coarse hardware cloth, or other such material, and held in position by the clamp shown in FIGS. 9 or 10, the guard overlying the media.

Although the nozzle sweep may be driven continuously back and forth between the positions determined by the limit switches 82 and 84, it may be desirable to operate the sweep periodically or start the operation in response to an increase in air pressure drop through the screen due to a build up of solids thereon. When operation is intermittent, it is desirable to have the sweep nozzle stop at the center of its travel so as to avoid unnecessary obstruction to the air stream approaching the screen. For this purpose a switch 18 may be actuated to open position by the pin 86, when the nozzle reaches a mid position and is moving in direction A. Switch 18 on opening will deenergize solenoid switch 16, to open the circuit to the motor 80. The switch 18 is provided with a pin engaging finger 17 which yields when engaged by the pin 86 moving in direction B. To start the motor 80, a pressure switch 14 responsive to a predetermined differential pressure across the screen will close a circuit to energize the solenoid of switch 16 to energize the motor 80. The switch 18 when not held open by engagement of the pin 86 with arm 17 moving in the direction of arrow A, will maintain the circuit closed for one full sweep cycle consisting of movement of the nozzle from the center to one end, back to the other end, and back to the center position. If switch 14 has not opened by a sufficient drop in differential pressure, when the contacts 18 are momentarily opened by the pin 86 reaching the center position, the nozzles will continue to sweep through a second full sweep cycle, and so on until contacts of switch 14 open, whereupon the cycle will always be completed and terminated by opening of switch 18. Instead of switch 14 being actuated by differential pressure, it may be actuated by a timer which will periodically close the switch long enough to start the motor 80, and move pin 86 beyond arm 17, whereupon a full sweep cycle will be effected. More than one sweep cycle may be provided for by closing the time controlled switch for a length of time greater than the time consumed to complete a single cycle.

Figure 11:
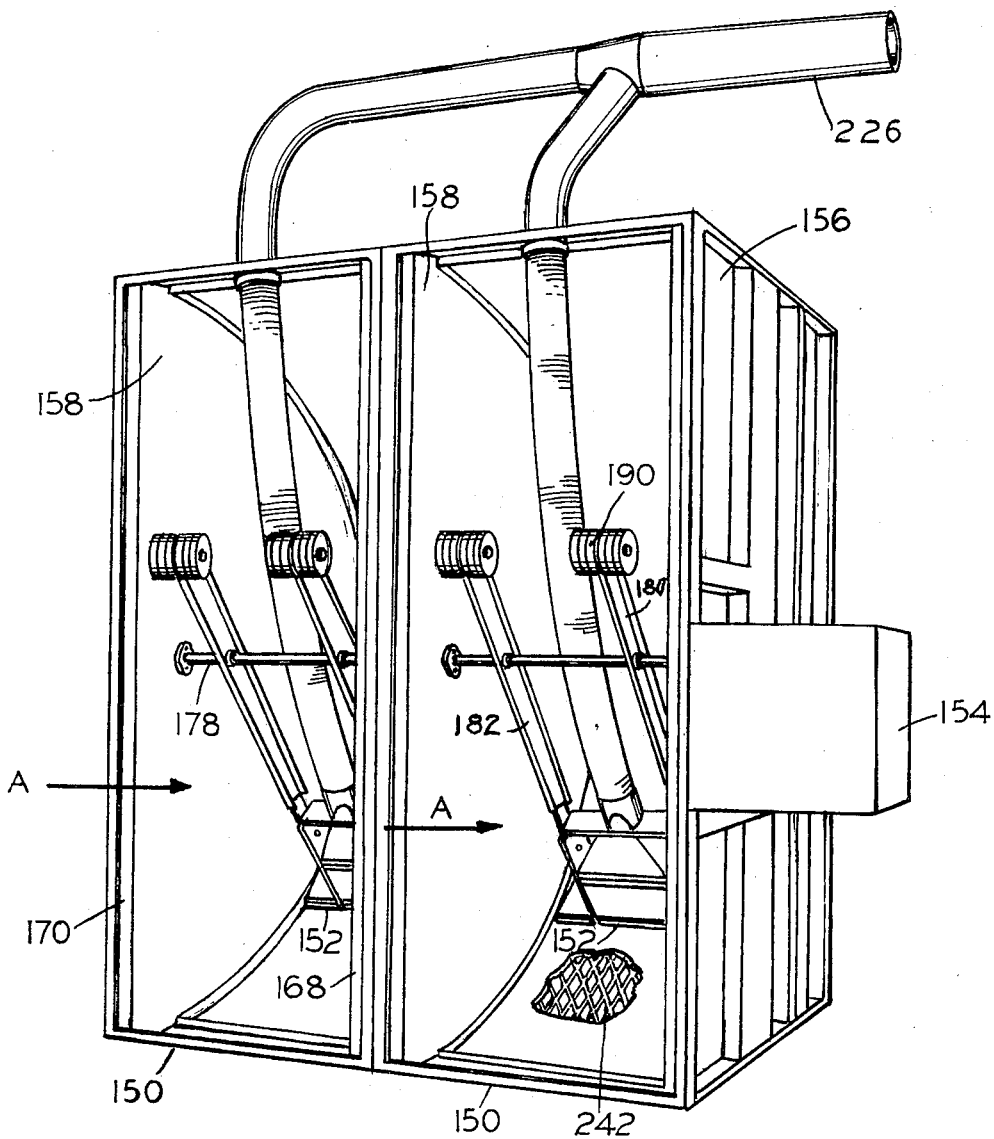
FIG. 11 is a perspective view of a two module collecting assembly arranged about a horizontal axis.

In FIGS. 11-17, the filter system employs a screen disposed in a semi-cylindrical configuration about a horizontal axis, with a suction nozzle oscillating vertically between the upper and lower ends of the screen. In FIG. 11, two modules 150 of the filter are shown side by side with the oscillator drive to the nozzles 152 effected by a single drive unit 154, disposed to one side of the right hand module. Each module comprises rectangular side walls 156 and 158, and top and bottom members 160 and 162 forming in effect, a rectangular sectioned duct into which air carrying solid particles to be removed enters in the direction of arrows A. Each module is provided with a rectangular upstream frame formed of upper and lower wide channel members 164 and 166, and side uprights 168 and 170, or as many modules arranged side by side, or stacked in several layers as desired, are coupled to a duct in the manner indicated in FIG. 12, such duct comprising a rectangular sectioned portion 172 adjacent the module or modules which are in turn coupled to a relatively high velocity supply duct of a reduced cross section, transitional ducting as indicated at 174 being employed. The portion 172 may be provided with a door 176 in one side wall for access to the duct, and the filter or filters. In practice, each module may have a standard overall height of 10 feet, and width of 4 feet, with a depth sufficient to house the semi-cylindrical filter media on a radius somewhat under 5 feet, the depth being about 6 or 6½ feet.

As shown, each module is provided with a rock shaft 178 concentric with the axis of semi-cylindrical filter media 257, and particularly its semi-cylindrical expanded metal backing support 242. Such shaft may be of a length to extend through all adjacent modules, or individual to each module and together as one shaft coupled. The shaft is oscillated through an arc of about 180 degrees by power apparatus disposed in the housing 154 and similar to that described in regard the vertical axis version. Provision is made to stop the apparatus midway between the upper and lower limits, when operation of the section apparatus is shut down for intervals.

Affixed to the shaft 178 are spaced arms 180 and 182 having affixed therebetween a nozzle assembly 184, the nozzle assembly being adjustable as to radius through the use of the slots 186, and bolts 188 by which the nozzle assembly is affixed to the arms 182 and 180. The opposite ends of the arms are provided with counter weights 190 to closely counter balance the nozzle weight.

The nozzle comprises an elongate opening 195 formed by a rectangular frame 197 of spaced cylindrical tubular members 192 and 194 joined at the ends by short tubular members 196 and 198 having a varying cross-sectional duct 204 leading thereto composed of triangular plates 200 and 202 and narrower side plates 204, welded or otherwise secured at their joining edges. Duct 204 is welded to the frame 197 at one end, and forms a substantially square opening 206 at the other, to which is secured a transitional fitting 208 varying from a substantially square cross section to a circular cross section, where it joins with a flexible suction tube 210, as at 212. The duct is provided with stiffness ribs 214, and a carrying frame comprising spaced side plates 216 and 218, slotted as at 220 to receive the duct, and having transverse members 222 and 224 extending to the square throat 206. The side plates 216 are adjustably secured to the arms 180, 182, as previously indicated. The tube 210 leads to a suction blower either directly or by way of a common manifold 226.

Mounted on the inside walls 156 and 158 are arcuate flanged channel members 230 of about 180 degrees in length, and disposed at a uniform radius from the axis of the shaft 178.

Figure 16:
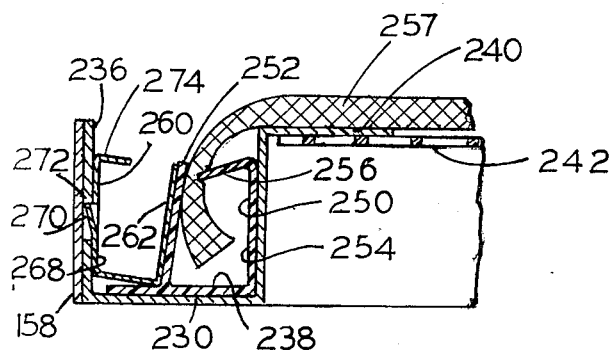
FIG. 16 is a fragmentary, sectional view taken on the line 16—16 of FIG. 13 through a side edge of the screen and backing plate showing the securing of the screen along its edge.

Also connecting the ends of the channel members are transverse members of similar section, 232 and 234, the section of the members 230-234 being indicated in FIG. 16. As shown, the members 230 have a side flange 236 secured to the opposite side walls 156 and 158 of each module, while the end members 232 and 234 have their base webs 238 secured to the top and bottom members 160 and 162. The end members 232 and 234 are connected to the ends of the arcuate side members 230 by mitered joints or otherwise as desired. Each of the members 230, 232 and 234 have lateral flanges 240 to which is secured an arcuate section of expanded metal 242 disposed on a radius about the shaft 178.

Disposed within the channel members 230, 232 and 234, is a resilient plastic extrusion 250 of F section, arcuate lengths of which are disposed in the channels of the members 230, and straight sections in the members 232 and 234, respectively, substantially in the position indicated in FIG. 16. The extrusion includes a resilient bendable rib 252 and an end flange 254 having a lengthwise lip 256 extending toward the end of the rib 252. A sheet of filter media 257 is disposed on the perforate support 242, with its perimetral edges extending into the groove formed by the rib 252 and lip 256 of the plastic extrusion 250.

The edge of the media is squeezed and locked into position by a plurality of spring metal "C" clips 260 (see FIGS. 16 and 17) one side 262 of which bears against the rib 252, while the other side 268, bears against the side flange 236 of the members. A locking tongue 270 cut from the side 268 is sprung into suitable slots 272 in the flange 236. The clips are disposed at intervals of about 6 inches as the clips are pushed into place. The side 268 is provided with an inbent flange 274 to facilitate pushing the clips into place, to seat the tongue 270 in its respective slot 272 while pressing the rib 252 towards the lip 256 to squeeze and hold the edge portion of the media 257 in position. The flange 274 also assists in removing the clips whenever the media requires replacement.

The filter media may be an open cell polyurethane foam as thick as three-eighths of an inch and may flex into nozzle contact as the nozzle sweeps past, due to nozzle suction, all of which tends to keep the media clean. Alternatively, as pointed out previously, the filter may comprise a rigid screen in which case the nozzle orifice would be positioned substantially in contact therewith, rather than being spaced and flexing the filter media into contact. The nozzle at its end of travel clears the transverse channel or entrance skirt 280 of any particles that may fall out of the air stream by reason of its reduction in velocity as it passes through the section 172 into the filter module. It will be seen that the semi-cylindrical filter is subjected to radial flow over an area about 170 percent of the cross sectional area of the module, and that the deposit of solid particles on the media is relatively uniform over the entire area. When flexible filter media is employed, the nozzle spacing may be one-fourth inch from the media, with the media held against the expanded metal backing by the air flow into the duct and through the media. Suction at the nozzle tends to lift the media into nozzle contact creating reverse flow through the media to clear the media of solid particles built up by the air stream through the remaining area of the media. It will be observed that the only moving part is the nozzle, and the need for seals in either form of the invention is completely eliminated. It will also be understood that the air flow rate through the media, which may be as high as 500 feet per minute, is less than that entering the module by reason of the expanded length due to being disposed in semi-cylindrical form. The simplicity resulting from such form avoids irregular build up and complicated ducting required by cylindrical filters, and the seals that are also required, if of the rotary type.

Any number of modules may be arranged side by side or stacked or both if desired, and the modules may be disposed in varying positions so that air enters in a horizontal stream or in a vertical or inclined stream without loss of advantages.

While variations of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

I claim:

1. Collecting apparatus for airborne solid particles comprising:
   a. an air duct of substantially rectangular configuration;
   b. means to support a substantially rectangular section of filter media in a substantially semi-cylindrical configuration crosswise of said duct;
   c. differential pressure means to move air to the inside surface of the media for deposit of solid particles thereon;
   d. a nozzle mounted for reciprocating movement about an axis concentric with the axis of the semi-cylindrical configuration and having a suction orifice extending parallel with said axis, said nozzle orifice being radially disposed at a distance from said axis not greater than the radius of the media configuration;
   e. means for applying suction to the nozzle to remove solid particles from said media; and
   f. means for reciprocally moving said nozzle about said axis over substantially the entire arcuate length of said filter media.

2. The invention according to claim 1 and further including means for automatically terminating the operation of said reciprocal moving means when the nozzle is in a mid-position of its reciprocal movement.

3. The invention according to claim 1 wherein said filter media is flexible and said means to support the media comprises a semi-cylindrical, relatively rigid sheet of perforate material disposed concentric with axis, and at a radius slightly greater than the nozzle orifice radius to flex the media away from the support means under nozzle suction.

4. The invention according to claim 3 wherein the media comprises a sheet of open cell polyurethane.

5. The invention according to claim 3 wherein said perforate material comprises expanded metal.

6. The invention according to claim 3 wherein the axis about which said nozzle moves is horizontal, and the ends of the perforate media support means are substantially tangential to the upper and lower walls of the duct.

7. The invention according to claim 6 wherein the reciprocal movement of the nozzle terminates slightly beyond the lower end of the support means.

8. The invention according to claim 6 wherein the nozzle is provided with a counter balance.

9. The invention according to claim 6 wherein the nozzle is connected to suction means by a flexible conduit capable of permitting the nozzle to oscillate through its full range.

10. The invention according to claim 6 wherein the perforate media support means is provided with a marginal channel to receive the marginal edge of a rectangular section of media disposed on the support means.

11. The invention according to claim 10 wherein said channel is provided with substantially continuous gripping means for the perimetral edge of said section of media.

12. The invention according to claim 11 wherein the channel has disposed therein an "F" section resilient extrusion having a rib and tongue for gripping the media side and end edges.

13. The invention according to claim 12 wherein resilient locking clips are disposed in the channel bearing against the extrusion rib to clamp media between the rib and tongue.

14. Collecting apparatus for airborne solid particles comprising:

a. an air duct of substantially rectangular configuration;

b. a frame comprising spaced parallel supports connected by spaced, substantially parallel arcuate members, a rectangular section of filter media affixed to the supports to provide a substantially semi-cylindrical surface;

c. means to move air to the inside surface of the media;

d. a nozzle having an elongate suction orifice extending parallel with said parallel supports and mounted to oscillate on an axis concentric with the axis of the arcuate members, said nozzle orifice being radially disposed at a distance from the axis not greater than the radius of the curved surface of said arcuate members;

e. means for applying suction to the nozzle to remove solid particles from said media by suction; and f. means for oscillating said nozzle about said axis over substantially the entire arcuate length of said filter media between said supports.

15. The invention according to claim 14 wherein the oscillating means includes means for automatically terminating the operation of the oscillating means when the nozzle is in a mid-position of its oscillatory movement.

16. The invention according to claim 14 wherein said media is flexible, a cylindrical, relatively rigid support of perforate sheet material is disposed over the downstream side of the media concentric with the nozzle axis, and at a radius slightly greater than the nozzle orifice radius to flex the media away from the support, in response to suction at the nozzle.

* * * * *